(12) United States Patent
Zeng et al.

(10) Patent No.: US 11,294,256 B2
(45) Date of Patent: Apr. 5, 2022

(54) METHOD AND SYSTEM FOR CONTROLLING OPTICAL FREQUENCY COMB

(71) Applicants: Chongqing Institute of East China Normal University, Chongqing (CN); SHANGHAI LANGYAN OPTOELECTRONICS TECHNOLOGY CO., LTD., Shanghai (CN); East China Normal University, Shanghai (CN)

(72) Inventors: Heping Zeng, Chongqing (CN); Shuang Li, Chongqing (CN); Xuling Shen, Shanghai (CN)

(73) Assignees: Chongqing Institute of East China Normal University, Chongqing (CN); SHANGHAI LANGYAN OPTOELECTRONICS TECHNOLOGY CO., LTD., Shanghai (CN); East China Normal University, Shanghai (CN)

( * ) Notice: Subject to any disclaimer, the term of this patent is extended or adjusted under 35 U.S.C. 154(b) by 0 days.

(21) Appl. No.: 17/169,492

(22) Filed: Feb. 7, 2021

(65) Prior Publication Data
US 2021/0265804 A1    Aug. 26, 2021

(30) Foreign Application Priority Data

Feb. 24, 2020    (CN) .......................... 202010113466.8

(51) Int. Cl.
*G02F 1/35*    (2006.01)
*H01S 3/13*    (2006.01)
*H01S 3/131*    (2006.01)

(52) U.S. Cl.
CPC ............ *G02F 1/353* (2013.01); *H01S 3/1305* (2013.01); *H01S 3/1307* (2013.01);
(Continued)

(58) Field of Classification Search
CPC ............................. G02F 1/353; G02F 2203/56
See application file for complete search history.

(56) References Cited

U.S. PATENT DOCUMENTS

| | | | | |
|---|---|---|---|---|
| 2008/0285606 | A1* | 11/2008 | Kippenberg | H04B 10/506 372/32 |
| 2016/0134078 | A1* | 5/2016 | Gaeta | H01S 5/5054 372/6 |
| 2021/0265803 | A1* | 8/2021 | Zeng | H01S 3/1109 |

FOREIGN PATENT DOCUMENTS

| | | |
|---|---|---|
| CN | 1694321 A | 11/2005 |
| CN | 103904546 A | 7/2014 |

(Continued)

*Primary Examiner* — Daniel Petkovsek

(57) ABSTRACT

A method and a system for controlling an optical frequency comb, where the working power of the pump source is dynamically adjusted and controlled, which not only greatly shortens a control time of a stable mode-locking and realizes a fast mode-locking control, but also quickly stabilizes the power control of stable working condition, thereby reducing unnecessary power consumption caused by power reciprocating oscillation tracking controls and better achieving the energy-saving effect of the power adjustment control process. The temperature of the working environment of the pump source is dynamically adjusted and controlled, so that the environment temperature can quickly reach the reference environment temperature required for mode-locking, which not only creates a good temperature condition for the mode-locking of the optical comb system, but also improves the efficiency of environment temperature stability control in the stable working conditions.

4 Claims, 2 Drawing Sheets

(52) U.S. Cl.
CPC ........ *H01S 3/1317* (2013.01); *G02F 2203/56* (2013.01); *H01S 3/1312* (2013.01)

(56) References Cited

FOREIGN PATENT DOCUMENTS

| | | | |
|---|---|---|---|
| CN | 104167660 A | 11/2014 | |
| CN | 106785838 A | 5/2017 | |
| CN | 107968682 A | 4/2018 | |
| CN | 110350391 A | 10/2019 | |
| WO | WO-2013040168 A2 * | 3/2013 | ........... H01S 3/1307 |

* cited by examiner

Collect working feedback parameters of an optical frequency comb system, including a power parameter of a pump source, a temperature parameter of the pump source, and a temperature parameter of a working environment of the pump source

↓

According to the working feedback parameters and a preset control parameter of a working condition, dynamically adjust a working power of the pump source or/and a temperature of the working environment of the pump source in the optical frequency comb system, thereby achieving a stable control of the optical frequency comb

FIG. 1

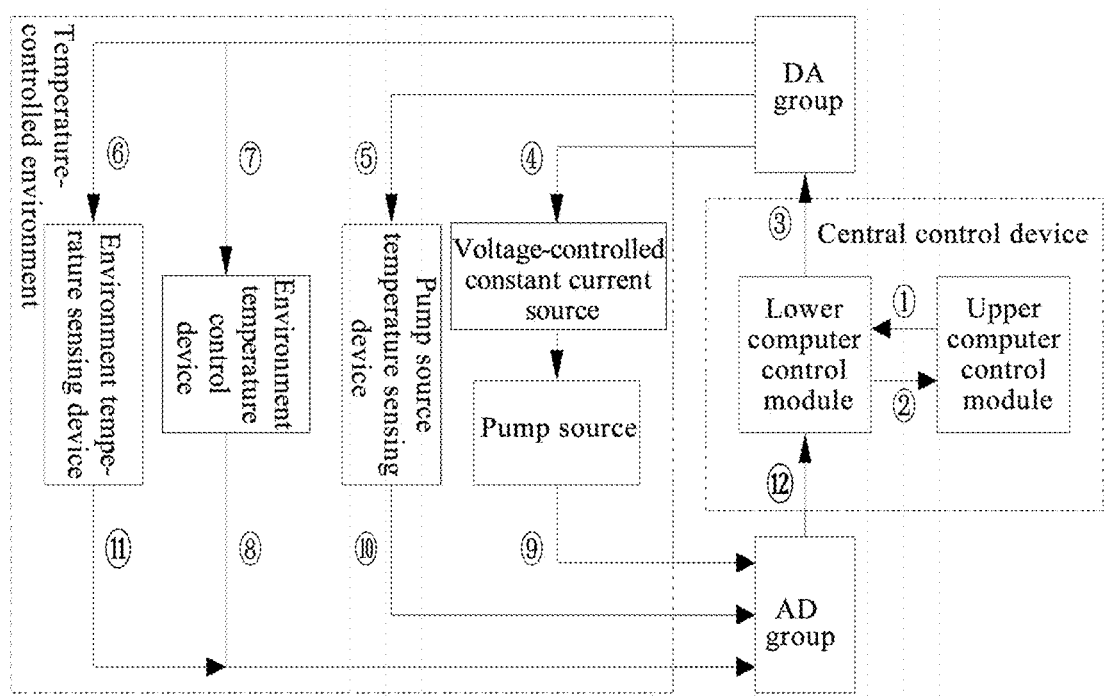

FIG. 2

METHOD AND SYSTEM FOR CONTROLLING OPTICAL FREQUENCY COMB

CROSS-REFERENCE TO RELATED APPLICATIONS

This application claims the benefit of priority from Chinese Patent Application No. 202010113466.8, filed on Feb. 24, 2020. The content of the aforementioned application, including any intervening amendments thereto, is incorporated herein by reference in its entirety.

TECHNICAL FIELD

The present application relates to laser control technologies, and more particularly to a method and a system for controlling an optical frequency comb.

BACKGROUND

An optical frequency comb (OFC) refers to a spectrum consisting of a series of equally spaced frequency components with a coherently stable phase relationship. With the rapid development of optical communication technology, optical frequency combs have attracted the attention of more and more scholars due to their wide applications in optical arbitrary waveform generation, multi-wavelength ultrashort pulse generation, and dense wavelength division multiplexing.

Optical frequency combs have become a major breakthrough in laser technology following the advent of ultrashort pulse lasers. In this field, scientists J. Hall and T. W. Hansch who carried out pioneering work won the Nobel Prize in 2005. In principle, the optical frequency comb appears as an optical frequency sequence with equal frequency intervals in the frequency domain, and as an electromagnetic field oscillation envelope with a femtosecond time width in the time domain, where the spectral width of the optical frequency sequence and the time width of the slowly varying envelope of the electromagnetic field oscillation satisfy the Fourier transform relationship. The distribution characteristics of the ultrashort pulses in the time domain and frequency domain is similar to a comb used in our daily life, so it is visually called a frequency comb of the optical band, or "optical comb" for short. As an optical frequency integrated generator, the optical comb is by far the most effective tool for absolute optical frequency measurement. The optical comb can accurately and simply link the cesium atom microwave frequency standard with the optical frequency standard, which can not only provides a carrier for the development of high-resolution, high-precision, and high-accuracy frequency standards, but also provides an ideal research tool for scientific research directions such as precision spectra, astrophysics, and quantum manipulation, thereby gradually being used in the fields of precision measurement of optical frequency, measurement of atomic and ion transition energy level, remote signal clock synchronization and satellite navigation.

Although optical frequency combs are widely used in the field of optical frequency measurement, a debugging of mode-locking signals of the optical comb is a complicated process, in which the repetition frequency, the line width of the optical carrier envelope, and the stability of the mode-locking signal are affected by the influences of the pump power and the environment temperature, and the working temperature change caused by the heating of the pump source itself also affect the working stability, resulting in a decrease in a measurement accuracy of the optical comb system.

Therefore, it becomes an important research topic in the field of optical comb system control to effectively improve an working stability of the optical frequency comb system under different working condition and ensure a measurement accuracy.

SUMMARY

In order to solve the above-mentioned technical defects, the present disclosure provides a method for controlling an optical frequency comb, to solve a problem of insufficient working stability of the optical frequency comb under different working conditions, thereby better ensuring a measurement accuracy of the optical comb system.

To achieve the above-mentioned object, the present disclosure provides a method for controlling an optical frequency comb, comprising:

collecting working feedback parameters of an optical frequency comb system; wherein the working feedback parameters comprises a power parameter of a pump source, a temperature parameter of the pump source, and a working environment temperature parameter of the pump source; and according to the working feedback parameters and a preset control parameter of a working condition, dynamically adjusting a working power of the pump source or/and a working environment temperature of the pump source in the optical frequency comb system, thereby achieving a stable control of the optical frequency comb.

In an embodiment, the control parameter of the working condition comprises a power-temperature curve under a mode-locked state in a starting working condition and setting information of the working power of the pump source corresponding to a mode-locked state in a stable working condition; the power-temperature curve under the mode-locked state in the starting working condition shows a relationship between the temperature of the pump source in the starting working condition and the working power of the pump source required for mode-locking;

a process of dynamically adjusting the working power of the pump source comprises:

upon starting, according to a current temperature parameter of the pump source, searching a working power value of the pump source required for mode-locking corresponding to the current temperature of the pump source from the power-temperature curve under the mode-locked state in the starting working condition; adjusting and setting the working power of the pump source according to the working power value; and beginning to timing;

when the timing reaches a preset starting stabilization duration, adjusting and setting the working power of the pump source according to the setting information of the working power of the pump source corresponding to the mode-locked state in the stable working condition.

In an embodiment, the setting information of the working power of the pump source corresponding to the mode-locked state in the stable working condition comprises a power-temperature curve under the mode-locked state in the stable working condition, showing a relationship between the temperature of the pump source and the working power of the pump source required for mode-locking in the stable working condition;

a process of adjusting and setting the working power of the pump source according to the setting information of the working power of the pump source in the stable working condition comprises:

according to the current temperature parameter of the pump source, searching a working power value of the pump source required for mode-locking corresponding to a current temperature of the working environment of the pump source in real time from the power-temperature curve under the mode-locked state in the stable working condition; adjusting and setting the pump source according to the working power value.

In an embodiment, the control parameter of the working condition comprises a mode-locking reference environment temperature parameter and a pump source reference temperature parameter in a stable working condition;

a process of dynamically adjusting the temperature of the working environment of the pump source comprises:

upon starting, adjusting the temperature of the working environment of the pump source according to the mode-locking reference environment temperature parameter; after the temperature of the working environment of the pump source reaches the mode-locking reference environment temperature, continuously controlling the temperature of the working environment of the pump source according to the mode-locking reference environment temperature parameter, and determining in real time whether a difference between a collected temperature of the pump source and the pump source reference temperature parameter in the stable working condition exceeds a preset warning range of a self-adjusting temperature of the pump source; and adjusting the temperature of the working environment of the pump source when the difference exceeds the preset warning range, to restore the difference to the preset warning range.

The present disclosure further provides a system for controlling an optical frequency comb, comprising:

a pump source, arranged in a temperature-controlled environment for generating pump light;

a voltage-controlled constant current source, for driving the pump source; adjusting and controlling a working power of the pump source; and feeding back a power parameter of the pump source when the pump source is working;

a pump source temperature sensing device, for collecting a temperature parameter of the pump source when the pump source is working;

an environment temperature control device, for adjusting and controlling a temperature of the working environment of the pump source;

an environment temperature sensing device, for sensing a working environment temperature parameter of the pump source; and a central control device, for collecting the power parameter of the pump source, the temperature parameter of the pump source and the working environment temperature parameter of the pump source; and controlling the voltage-controlled constant current source or/and the environment temperature control device according to the collected parameters and a preset control parameter of a working condition, to further dynamically adjust the working power of the pump source or/and the temperature of the working environment of the pump source in an optical frequency comb system, thereby achieving a stable control of the optical frequency comb.

In an embodiment, the central control device comprises a lower computer control module and an upper computer control module;

the lower computer control module is provided for respectively communicating with the pump source temperature sensing device, the environment temperature sensing device, the voltage-controlled constant current source and the environment temperature control device; collecting and receiving the power parameter of the pump source from the voltage-controlled constant current source, the temperature parameter of the pump source from the pump source temperature sensing device, and the working environment temperature parameter of the pump source from the environment temperature sensing device; transmitting the collected parameters to the upper computer control module; and respectively sending control instructions to the voltage-controlled constant current source and the environment temperature control device according to instructions from the upper computer control module;

the upper computer control module is provided for instructing the lower computer control module to respectively send the control instructions to the voltage-controlled constant current source and the environment temperature control device according to the power parameter of the pump source, the temperature parameter of the pump source, the working environment temperature parameter of the pump source, and the preset control parameter of the working condition, to dynamically adjust the working power of the pump source or/and the temperature of the working environment of the pump source, thereby achieving the stable control of the optical frequency comb.

In an embodiment, a digital-to-analog (DA) group is provided between the lower computer control module and control signal terminals of the voltage-controlled constant current source, the environment temperature control device, the pump source temperature sensing device, and the environment temperature sensing device for respectively performing a digital-to-analog conversion communication, thereby converting a digital signal to an analog signal to control the voltage-controlled constant current source, the environment temperature control device, the pump source temperature sensing device, and the environment temperature sensing device; an analog-to-digital (AD) group is provided between the lower computer control module and feedback signal terminals of the voltage-controlled constant current source, the pump source temperature sensing device and the environment temperature sensing device for performing an analog-to-digital conversion communication, thereby converting a feedback analog signal to a digital signal; the digital signal is sent to the lower computer control module, and then transmitted to the upper computer control module through a digital signal transmission method.

In an embodiment, the preset control parameter of the working condition in the upper computer control module comprise a power-temperature curve under a mode-locked state in a starting working condition and setting information of the working power of the pump source corresponding to the mode-locked state in a stable working condition; the power-temperature curve under the mode-locked state in the starting working condition shows a relationship between the temperature of the pump source and the working power of the pump source required for mode-locking in the starting working condition;

the upper computer control module is configured to dynamically adjust the working power of the pump source by:

upon starting, searching a working power value of the pump source required for mode-locking corresponding to a current temperature of the pump source from the power-temperature curve under the mode-locked state in the starting working condition according to the current temperature parameter of the pump source; instructing the lower computer control module according to the working power value to control the voltage-controlled constant current source to adjust and set the working power of the pump source; and beginning to timing;

when the timing of the upper computer control module reaches a preset starting stabilization duration, instructing the lower computer control module to adjust and set the working power of the pump source according to the setting information of the working power of the pump source corresponding to the mode-locked state in the stable working condition.

In an embodiment, the setting information of the working power of the pump source corresponding to the mode-locked state in the stable working condition comprises a power-temperature curve under the mode-locked state in the stable working condition showing the relationship between the temperature of the pump source and the working power of the pump source required for mode-locking in the stable working condition;

the upper computer control module is configured to adjust and set the working power of the pump source according to the setting information of the working power of the pump source corresponding to the mode-locked state in the stable working condition by:

searching a working power value of the pump source required for mode-locking corresponding to a current temperature of the working environment of the pump source in real time from the power-temperature curve under the mode-locked state in the stable working condition according to the current temperature parameter of the pump source; and instructing the lower computer control module to control the voltage-controlled constant current source according to the working power value to adjust and set the working power of the pump source in real time.

In an embodiment, the preset control parameter of the working condition in the upper computer control module comprise a mode-locking reference environment temperature parameter and a pump source reference temperature parameter in the stable working condition; the upper computer control module is configured to dynamically adjust the temperature of the working environment of the pump source by:

upon starting, instructing the lower computer control module to control the environment temperature control device to adjust the temperature of the working environment of the pump source according to the mode-locking reference environment temperature parameter; after the temperature of the working environment of the pump source reaches the mode-locking reference environment temperature value, continuously controlling the temperature of the working environment of the pump source according to the mode-locking reference environment temperature parameter; and determining in real time whether a difference between a collected temperature of the pump source and the pump source reference temperature parameter in the stable working condition exceeds a preset warning range of a self-adjusting temperature of the pump source; when the difference exceeds the preset warning range, adjusting the temperature of the working environment of the pump source, to restore the difference to the preset warning range.

Compared to the prior art, the present invention has following beneficial effects.

1. In the method and system for controlling an optical frequency comb of the present invention, the working power of the pump source can be dynamic adjusted and controlled, which not only greatly shortens a control time of a stable mode-locked state, to realize a fast mode-locking control, but also quickly stabilizes the stable power control of the working condition, to reduce unnecessary power consumption caused by an unnecessary power reciprocating oscillation tracking control, thereby better achieving an energy-saving effect in the power adjustment control process.

2. In the method and system for controlling an optical frequency comb of the present invention, the temperature of the working environment of the pump source is dynamically adjusted and controlled, so that the environment temperature can quickly reach the reference environment temperature required for mode-locking, which not only creates a good temperature condition for the mode-locked state of the optical comb system, but also improves the environment temperature stability control efficiency in the stable working condition, which is beneficial to the optical comb system to better maintain the stable working condition.

3. In the method and system for controlling an optical frequency comb of the present invention, a fast mode-locking control can be effectively realized through a dynamic adjustment control and coordination of the working power of the pump source and the temperature of the working environment of the pump source, thereby better achieving the energy-saving effect in the power adjustment control process. At the same time, the efficiency of the stable operation and control of the optical frequency comb is improved, so that the problem of insufficient working stability of the optical frequency comb under different working conditions can be effectively solved, thereby better ensuring a measurement accuracy of the optical comb system.

BRIEF DESCRIPTION OF THE DRAWINGS

FIG. 1 is a flowchart of a method for controlling an optical frequency comb according to an embodiment of the present disclosure.

FIG. 2 is a schematic diagram of a structure of a system for controlling the optical frequency comb according to an embodiment of the present disclosure.

DETAILED DESCRIPTION OF EMBODIMENTS

Figure 3:
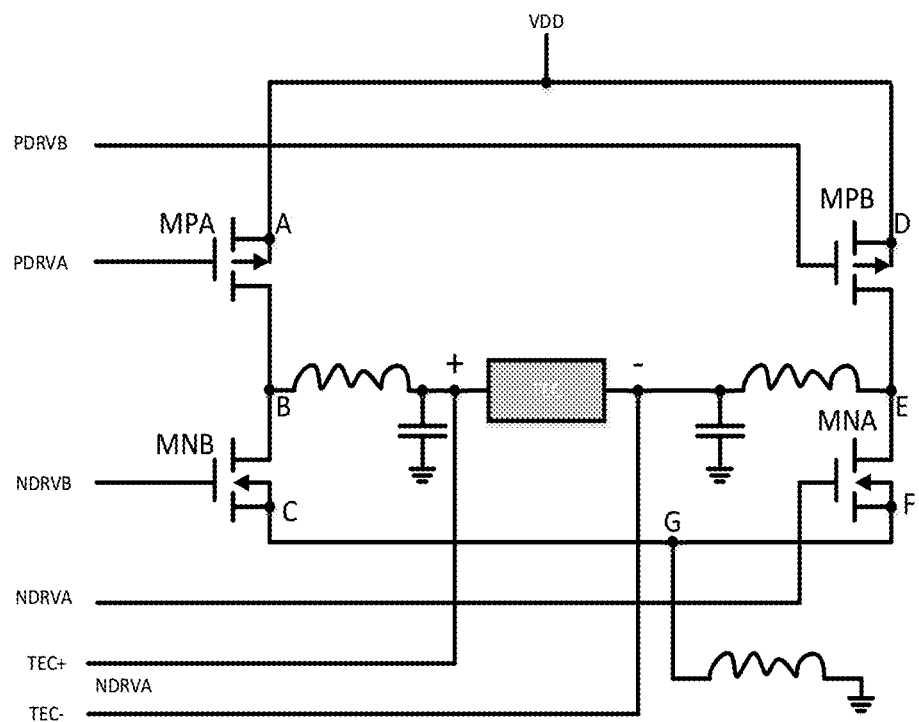
FIG. 3 is a schematic diagram of a semiconductor refrigerator control circuit adjusted by an H-bridge circuit according to an embodiment of the present disclosure.

As shown in FIG. 1, aiming at a practical application of optical frequency combs, the present disclosure provides a method for controlling an optical frequency comb, includes the following steps. Working feedback parameters of an optical frequency comb system are collected, where the working feedback parameters includes a power parameter of a pump source, a temperature parameter of the pump source, and a working environment temperature parameter of the pump source. According to the working feedback parameters and a preset control parameter of a working condition, a working power of the pump source of the optical frequency comb system or/and a temperature of the working environment of the pump source are dynamically adjusted, thereby achieving a stable control of the optical frequency comb.

Specifically, the technical solution of the present disclosure is as follows. The control parameter of the working condition is preset and the working feedback parameters of the optical frequency comb system are collected, the working power or/and the working environment temperature of the optical frequency comb system can be dynamically adjusted according to the working condition and the working feedback conditions of the collected optical frequency comb, which enables the optical frequency comb to adjust the working power of the pump source or/and the temperature of the working environment of the pump source adaptively according to the set control parameter of the working condition, thereby improving the stability of a working state of the optical transmission system, and better maintaining a measurement accuracy of the optical comb system.

In terms of specific design and implementation, based on the idea of the method for controlling the optical frequency comb provided by the present disclosure, to implement the above-mentioned control method, the present disclosure further provides a system for controlling an optical frequency comb, including:

a pump source, arranged in a temperature-controlled environment;

a voltage-controlled constant current source, for driving the pump source; adjusting and controlling a working power of the pump source; and feeding back power parameters of the pump source when the pump source is working;

a pump source temperature sensing device, for collecting a temperature parameter of the pump source when the pump source is working;

an environment temperature control device, for adjusting and controlling the temperature of the working environment of the pump source;

an environment temperature sensing device, for sensing a working environment temperature parameter of the pump source; and a central control device, for collecting the power parameter of the pump source, the temperature parameter of the pump source and the working environment temperature parameter of the pump source; and controlling the voltage-controlled constant current source or/and the environment temperature control device according to the collected parameters and a preset control parameter of a working condition, to further dynamically adjust the working power of the pump source or/and the temperature of the working environment of the pump source in an optical frequency comb system, thereby achieving a stable control of the optical frequency comb.

In an actual application, the voltage-controlled constant current source can be realized by the power supply equipment of the pump source with a constant current and a controllable voltage. The environment temperature control device can be realized by temperature control equipment or temperature control circuit with a two-way temperature control function of cooling and heating. The pump source temperature sensing device and the environment temperature sensing device can be realized by common temperature measuring devices such as thermistor temperature sensing devices. The above-mentioned devices are existing devices with mature technologies that can be purchased commercially.

In the specific design and implementation, the central control device can be designed to include a lower computer control module and an upper computer control module, to realize functions of data interactive transmission and adjustment operation control respectively. The lower computer control module is provided for respectively communicating with the pump source temperature sensing device, the environment temperature sensing device, the voltage-controlled constant current source and the environment temperature control device; collecting and receiving the power parameter of the pump source from the voltage-controlled constant current source, the temperature parameters of the pump source from the pump source temperature sensing device, and the working environment temperature parameter of the pump source from the environment temperature sensing device; transmitting the collected parameters to the upper computer control module; and respectively sending control instructions to the voltage-controlled constant current source and the environment temperature control device according to instructions from the upper computer control module. The upper computer control module is provided for instructing the lower computer control module to respectively send control instructions to the voltage-controlled constant current source and the environment temperature control device according to the power parameter of the pump source, the temperature parameter of the pump source, the working environment temperature parameter of the pump source, and the preset control parameter of the working condition, to dynamically adjust the working power of the pump source or/and the temperature of the working environment of the pump source, thereby achieving the stable control of the optical frequency comb.

In a design and implementation of the hardware architecture of the system for controlling the optical frequency comb, an implementation scheme with a hardware system architecture as shown in FIG. 2 can be adopted. The upper computer control module can control the voltage-controlled constant current source of the pump source and the environment temperature control device by instructing the lower computer control module to send instructions. In addition, the upper computer control module can further control the start-stop function of the pump source temperature sensing device and the environment temperature sensing device, where a control command signal flow is as a flow ①③④⑤⑥ shown in FIG. 2. The power parameter of the pump source from the voltage-controlled constant current source, the temperature parameter of the pump source from the pump source temperature sensing device, and the working environment temperature parameter of the pump source from the environment temperature sensing device can be collected and transmitted in real time through a data collection and transmission method by the lower computer control module and then fed back to the upper computer control module, where a data collection and transmission signal flow is as a flow ⑧⑪⑩⑨⑫② showed in FIG. 2.

Since the voltage-controlled constant current source, the environment temperature control device, the pump source temperature sensing device, and the environment temperature sensing device are usually electronic devices controlled by analog signals in the actual technical implementation. The central control device including the upper computer control module and the lower computer control module needs to perform operations after parameter collection, such as summary, comparison, judgment, and command control, so it is usually necessary to adopt a numerical control electronic device adopting digital chip combined with digital circuit in technical realization. Therefore, in the design and implementation of the hardware architecture of the system for controlling the optical frequency comb, a digital-to-analog (DA) group is provided between the lower computer control module and the control signal terminals of the voltage-controlled constant current source, the environment temperature control device, the pump source temperature sensing device, and the environment temperature sensing device for performing a digital-to-analog conversion, thereby converting a digital signal to an analog signal, to control the voltage-controlled constant current source, the environment temperature control device, the pump source temperature sensing device, and the environment temperature sensing device (as shown ④⑤⑥ in FIG. 2). An analog-to-digital (AD) group is provided between the lower computer control module and feedback signal terminals of the voltage-controlled constant current source, the pump source temperature sensing device, and the environment temperature sensing device for performing an analog-to-digital conversion, so that feedback analog signals are converted to digital signals and transmitted to the lower computer control module (as shown ⑫ in FIG. 2), and then collected by the lower computer control module and transmitted to the upper computer control module through a digital signal transmission method (as shown ② in FIG. 2). The DA group can be composed of a plurality of digital-to-analog converters, and the AD group can be composed of a plurality of analog-to-digital converters. Both the DA group and the AD group are controlled by the lower computer control module to uniformly control their respective conversion functions.

In the method and system for controlling the optical frequency comb of the present disclosure, the working power of the pump source or/and the temperature of the working environment of the pump source of the optical frequency comb system are dynamically adjusted according to the working feedback parameters and the preset control parameters of the working condition. The adjustment work is an important work content to realize the stable control of the optical frequency comb, and is completed by the upper computer control module of the central control device in the system for controlling the optical frequency comb. Both the dynamic adjustment of the working power of the pump source and the dynamic adjustment of the temperature of the working environment of the pump source need to adopt reasonable control strategies to achieve the purpose of stable control of the optical frequency comb better and faster. The present disclosure will be illustrated by the following specific embodiments.

Embodiment 1

In the embodiment, the dynamic adjustment and control of the working power of the pump source needs to adopt a control strategy aiming at high efficiency and energy-saving. When the optical frequency comb is activated, the temperature of the pump source is low, and the temperature of the working environment of the pump source may be lower or higher than the temperature of the pump source in the stable working condition, which will affect the mode-locking control of the optical frequency comb, so the working power of the pump source needs to be adjusted to balance the working environment temperature.

In one of the available adjustment strategies of the working power of the pump source, the mode-locked state of the optical frequency comb is judged and controlled. When the optical frequency comb is out of the mode-locked state, the working power of the pump source is gradually increased until the optical comb is in the mode-locked state to maintain the working power of the pump source. After the pump source works stably, as the temperature rises and it drives the change of the working environment temperature, the previously maintained working power of the pump source may appear to be overpowered, so that the working power of the pump source needs to be lowered. The optical comb may be out of the mode-locked state in a process of reducing the working power, so it is necessary to increase the working power of the pump source again until the power source is in the mode-locked state again. Therefore, there may be multiple reciprocating oscillations of the working power of the pump source in a tracking adjustment control, to achieve a relatively stable mode-locking control, resulting in a long time for stable mode-locking, and excess energy consumption in the power reciprocating oscillation tracking control.

Therefore, the embodiment provides a more preferred control strategy for adjusting the working power of the pump source, in which a preset control parameters of the working condition in the upper computer control module can be designed to include a power-temperature curve under a mode-locked state in the starting working condition and setting information of the working power of the pump source corresponding to the mode-locked state in the stable working condition. The power-temperature curve under the mode-locked state in the starting working condition shows a relationship between a temperature of the pump source in the starting working condition and a working power of the pump source required for mode-locking. A process that the upper computer control module dynamically adjusts the working power of the pump source is designed to includes the following steps.

Upon starting, the upper computer control module searches a current working power of the pump source required for mode-locking corresponding to a current temperature of the pump source from the power-temperature curve under the mode-locked state in the starting working condition according to a current temperature parameter of the pump source. The upper computer control module instructs the lower computer control module to control the voltage-controlled constant current source to adjust and set the working power of the pump source according to the current working power; and the upper computer control module begins to timing. When the timing of the upper computer control module reaches a preset starting stabilization duration, the upper computer control module instructs the lower computer control module to adjust and set the working power of the pump source according to the setting information of the working power of the pump source corresponding to the mode-locked state in the stable working condition.

In the above-mentioned preferred control strategy for adjusting the working power of the pump source, when the optical frequency comb is activated, the temperature of the pump source is low, and the temperature of the working environment of the pump source may be lower or higher than the temperature of the pump source in the stable working condition. Therefore, according to the current temperature parameter of the pump source, the current working power of the pump source required for mode-locking corresponding to a current temperature of the pump source is searched from the power-temperature curve under the mode-locked state in the starting working condition, and the working power of the pump source is adjusted and set according to the current working power to quickly realize the mode-locking control. The upper computer control module begins to timing, and when the timing of the upper computer control module reaches a preset starting stabilization duration, the upper computer control module instructs the lower computer control module to adjust and set the working power of the pump source according to the setting information of the working power of the pump source corresponding to the mode-locked state in the stable working condition. Therefore, the above-mentioned method for controlling the optical frequency comb not only greatly shortens the control time for stable mode-locking and realizes a fast mode-locking control, but also reduces unnecessary power consumption caused by unnecessary power reciprocating oscillation tracking controls, thereby better achieving an energy-saving effect of power adjustment control process.

In a power control in the stable working condition of the above-mentioned preferred control strategy for adjusting the working power of the pump source, the setting information of the working power of the pump source corresponding to the mode-locked state in the stable working condition can be designed to include the power-temperature curve under the mode-locked state in the stable working condition, showing the relationship between the temperature of the pump source and a working power of the pump source required for mode-locking in the stable working condition. A process that the upper computer control module adjusts and sets the working power of the pump source according to the setting information of the working power of the pump source corresponding to the mode-locked state in the stable working condition is designed as follows.

The upper computer control module searches in real time a working power value of the pump source corresponding to the current temperature of the working environment of the pump source from the power-temperature curve under the mode-locked state in the stable working condition according to the working environment temperature parameter of the pump source collected by the lower computer control module, and instructs the lower computer control module to control in real time the voltage-controlled constant current source to adjust and set the working power of the pump source according to the working power value of the pump source.

Therefore, in the power control in the stable working condition, since the pump source has been working for a period of time, the temperature of the pump source tends to a stable state, and the fluctuation of the environment temperature becomes a main factor affecting the working state of the pump source. Therefore, according to the collected working environment temperature parameter of the pump source in real time, the working power value of the pump source corresponding to the current temperature of the working environment of the pump source can be searched from the power-temperature curve under the mode-locked state in the stable working condition, and the working power of the pump source is adjusted and set in real time. In this way, the working power of the pump source is directly controlled according to the preset power-temperature curve, so that the power control in the stable working condition can be quickly stabilized, which not only reduces the time required for power reciprocating oscillation tracking control and improves the efficiency of stable control, but also reduces unnecessary power consumption caused by the power reciprocating oscillation tracking control, thereby better achieving an energy-saving effect of power adjustment control process.

In the above-mentioned preferred control strategy for adjusting the working power of the pump source, parameter information such as the power-temperature curve under the mode-locked state in the starting working condition, the setting information of the working power of the pump source corresponding to the mode-locked state in the stable working condition, and the starting stable duration can be obtained through previous knowledge, experience, or a previous test statistics. After obtaining these parameter information, the above-mentioned preferred control strategy for adjusting the working power of the pump source can be executed, to achieve technical effects of fast mode-locking control and energy-saving of the power adjustment control process.

The central control device of the system for controlling the optical frequency comb of the present disclosure can be implemented through the following command control scheme in the adjustment process of the working power of the pump source.

The upper computer control module sends the instructions to adjust the working power of the pump source through a software interface. The instructions can be designed to be composed of an initial segment, an address segment, a control segment, and an tail segment. The initial segment is composed of a fixed hexadecimal system, including 16 bits, such as A0A0. The address segment informs the lower computer of a pump serial number currently to be operated, including 8 bits, which can support up to 256 pump source control objects. The control segment is a current command which will act on the voltage value of the pump voltage-controlled constant current source, including 16 bits. The tail segment is a transmission end mark, including 8 bits, generally adopts FF, and is provided for marking an end of the transmission instruction. The instruction structure is shown in Table 1:

TABLE 1

| Instruction structure of upper computer control FPGA | | | |
| --- | --- | --- | --- |
| Initial segment (16 bit) | Address segment (8 bit) | Control segment (16 bit) | Tail segment (8 bit) |
| A0A0 | XX | XXXX | FF |

The instruction is sent to an FPGA control board of the lower computer control module through a serial communication interface. The FPGA control board parses the instruction to obtains the pump serial number to be adjusted, and obtains a corresponding value for driving the analog-to-digital converters. According to the control interface timing, the drive value is transmitted to the analog-to-digital converters of the DA group.

The analog-to-digital converters compare the reference voltage value with the digital voltage value sent by the lower computer control module, and output the corresponding analog voltage value to drive the voltage-controlled constant current source. The relationship between the output analog voltage value and the control value of the upper computer control module is as follows:

Analog voltage value=control value of upper computer control module×(reference voltage value/$2^{DA\ conversion\ digits}$).

According to the analog voltage value output by the digital-to-analog converters of the DA group, the voltage-controlled constant current source generates a constant current corresponding to the control instruction issued by the upper computer control module through a MOS tube, a sampling resistor, a negative feedback and other circuit structures, thereby realizing an adjustment of the working power of the pump source, and an adjustment of the mode-locked state of the optical comb.

Embodiment 2

The embodiment provides a high-efficient and stable control strategy for dynamically adjusting and controlling the temperature of the working environment of the pump source. When the optical frequency comb is activated, the temperature of the pump source is low, and the temperature of the working environment of the pump source may be lower or higher than the temperature of the pump source in the stable working condition, which will affect the mode-locking control of the optical frequency comb. Therefore, except by adjusting the pump source to balance the working power, the stable control of the temperature of the working environment of the pump source is also an important factor to ensure the fast mode-locking and stable operation of the optical frequency comb.

In one of available adjustment strategies of the temperature of the working environment of the pump source, the temperature is controlled stably according to the temperature of a mode-locking environment. Since the optical comb system has been working stably for a period of time, the environment temperature may increase due to the continuous operation of the equipment, so the environment temperature can be adjusted by an environment temperature control device to maintain in a stable temperature of the mode-locking environment. The environment temperature control method is relatively simple, but it actually has a certain control hysteresis for the stable operation of the optical comb system. Compared to the environment temperature, the working temperature of the pump source has a more direct impact on the stability of the optical comb system. After a period of operation, the working temperature of the pump source increases due to continuous work. If the environment temperature is significantly higher than the environment temperature required for mode-locking due to the increase in the working temperature of the pump source, it is indicated that the working temperature of the pump source has been higher than an expected temperature for a period of time. There will be a certain control hysteresis to balance the working temperature of the pump source by adjusting the ambient temperature at this time, which is not conducive to maintain a good and stable working condition of the optical comb system.

Therefore, the embodiment provides a more preferred implementation of the control strategy for adjusting the temperature of the working environment of the pump source. In the dynamic adjustment and control of the temperature of the working environment of the pump source, the control parameters of the working condition preset in the upper computer control module can be designed to include a mode-locking reference environment temperature parameter and a pump source reference temperature parameter in stable working condition. The upper computer control module dynamically adjusts the temperature of the working environment of the pump source as follows.

Upon starting, the upper computer control module instructs the lower computer control module to control the environment temperature control device to adjust the temperature of the working environment of the pump source according to the mode-locking reference environment temperature parameter. When the temperature of the working environment of the pump source reaches the mode-locking reference environment temperature value, the temperature of the working environment of the pump source is continuously controlled according to the mode-locking reference environment temperature parameters, and whether a difference between a collected temperature of the pump source and the pump source reference temperature parameter in the stable working condition exceeds a preset warning range of a self-adjusting temperature of the pump source is determined in real time. When the difference exceeds the preset warning range, the temperature of the working environment of the pump source is adjusted, so that the difference is restored to the preset warning range of the self-adjusting temperature of the pump source.

In the above-mentioned preferred adjustment control strategy of the temperature of the working environment of the pump source, when the optical frequency comb is activated, the temperature of the pump source is relatively low, and the temperature of the working environment of the pump source may be lower or higher than the stable working temperature, so the temperature of the working environment of the pump source is adjusted according to the mode-locking reference environment temperature parameter, so that the environment temperature can quickly reach the reference environment temperature required for mode-locking, thereby creating a good temperature condition for mode-locking of the optical comb system. After the temperature of the working environment of the pump source reaches the mode-locking reference environment temperature value, the temperature of the working environment of the pump source is continuously controlled according to the mode-locking reference environment temperature parameter, so the working temperature of the pump source itself gradually increases. In order to improve the timeliness of the stable operation control of the optical comb system, the temperature of the working environment of the pump source needs to be continuously controlled according to the mode-locking reference environment temperature parameter, and whether a difference between a collected temperature of the pump source and the pump source reference temperature parameter in the stable working condition exceeds a preset warning range of the self-adjusting temperature of the pump source is determined in real time. When the difference exceeds the preset warning range, the temperature of the working environment of the pump source is adjusted, so that the difference is restored to the preset warning range of the self-adjusting temperature of the pump source. On this basis, the temperature of the working environment of the pump source is controlled continuously according to the mode-locking reference environment temperature parameter.

Specifically, a value of the preset warning range of the self-adjusting temperature of the pump source needs to be determined according to the self-adjustment temperature range of the pump source. The self-adjustment temperature range of the pump source refers to a temperature range within which the working temperature of the pump source can be effectively adjusted by adjusting and controlling the working power of the pump source, and the value interval of the self-adjustment temperature range can be determined by prior experiments. A lower limit of the value interval of the preset warning range of the self-adjusting temperature should be greater than a lower limit of the self-adjustment temperature range of the pump source, and an upper limit of the value interval of the preset warning range of the self-adjusting temperature should be smaller than a lower limit of the self-adjustment temperature range of the pump source, that is, the preset warning range of the self-adjusting temperature of the pump source is a proper subset that does not include the upper and lower limits of the self-adjusting temperature of the pump source.

When it is determined that the difference between the pump source temperature and the pump source reference temperature parameter in the stable working condition exceeds the preset warning range of the self-adjusting temperature of the pump source, the pump source temperature of the pump source at this time should be maintained within the self-adjustment temperature range, and the pump source's own working temperature is immediately adjusted by controlling the environment temperature, to achieve purposes of adjusting the working temperature of the pump source in time, reducing the hysteresis of the temperature control adjustment, and improve the stable control efficiency, which is conducive to better maintain the stable working condition of the optical comb system.

When the central control device of the system for controlling the optical frequency comb of the present disclosure specifically works in the working mode of the temperature adjustment control of the working environment of the pump source, it can be implemented through the following command control scheme.

In a specific implementation, at a temperature parameter collection end, the temperature parameter of the pump source and the working environment temperature parameter of the pump source can be collected by using NTC thermistors respectively. The NTC thermistors generate the corresponding analog voltages according to the current temperature change in real time, and feed it back to the analog-to-digital converters of the AD group. The analog-to-digital converters generates the digital voltages corresponding to the analog voltages, where the accuracy is proportional to the AD conversion digits. The FPGA control board of the lower computer control module can read the digital voltage value in real time through the SPI serial protocol, and transmit to the upper computer control module. When the upper computer control module needs to read the current temperature in a monitoring process, it sends instructions to the FPGA control board of the lower computer control module. The transmitted instructions can be designed to be composed of a start segment (A0A0), an address segment (XX), and an tail segment (FF). Since the data of the lower computer are read, the address segment can accurately correspond to the address of the AD converters, without the control segment. After the FPGA control board of the lower computer control module receives the read instruction from the upper computer control module, it sends the currently acquired digital voltage to the upper computer control module. The transmission structure is the same as Table 1, where the control segment is the read digital voltage value. The upper computer control module analyzes the received data frame, separates the digital voltage value, and determines the current temperature parameter in real time according to the relationship between the voltage and the temperature.

In specific implementation, at the environment temperature control end, the environment temperature control device can adopt a commonly used semiconductor refrigerator regulated by the H-bridge circuit to perform cooling and heating bidirectional temperature control. The control circuit of the semiconductor refrigerator regulated by the H-bridge circuit is as shown in FIG. 3. In the control process, the upper computer control module issues a temperature control command to act on the semiconductor refrigerator adjusted by the H-bridge circuit to adjust the environment temperature.

As shown in FIG. 3, the control circuit of the semiconductor refrigerator adjusted by the H-bridge circuit includes a semiconductor refrigerator (TEC), and a first bridge branch and a second bridge branch connected in parallel at both ends of the semiconductor refrigerator (TEC). A first PMOS tube (MPA) and a second PMOS tube (MPB) are connected in series in the bridge branch. A source of the first PMOS tube (MPA) is connected to a source of the second PMOS tube (MPB), and they both are connected to a power supply terminal (VDD). A drain of the first PMOS tube (MPA) is connected in parallel to a positive terminal (TEC+) of the semiconductor refrigerator (TEC), and a drain of the second PMOS tube (MPB) is connected in parallel to a negative terminal (TEC−) of the semiconductor refrigerator (TEC). The first NMOS tube (MNA) and the second PMOS tube (MNB) are connected in series in the second bridge branch. A source of the first NMOS tube (MNA) and a source of the second NMOS tube (MNB) are connected and then connected to a ground terminal. A drain of the first NMOS tube (MNA) is connected in parallel to the negative terminal (TEC−) of the semiconductor refrigerator (TEC). A drain of the second NMOS tube (MNB) is connected in parallel to a positive terminal (TEC+) of the semiconductor refrigerator (TEC). the gates of the first PMOS tube (MPA), the second PMOS tube (MPB), the first NMOS tube (MNA) and the second PMOS tube (MNB) are respectively connected to a first voltage control terminal (PORVA), a second voltage control terminal (PORVB), a third voltage control terminal (NORVA) and a fourth voltage control terminal (NORVB).

Figure 4:
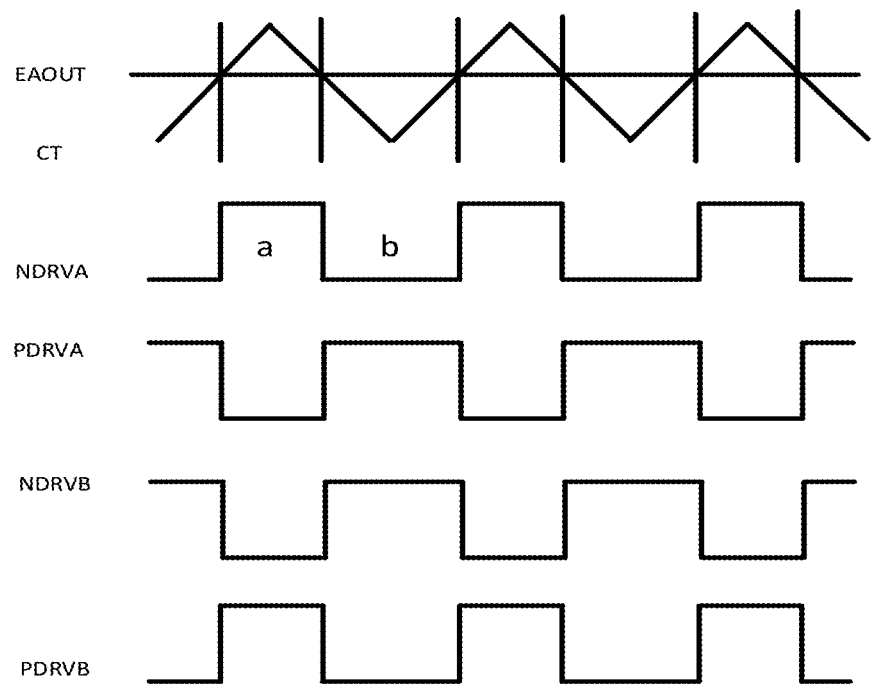
FIG. 4 is a diagram showing MOS control waveforms of the semiconductor refrigerator control circuit adjusted by the H-bridge circuit according to an embodiment of the present disclosure.

In the semiconductor refrigerator control circuit regulated by the H-bridge circuit, VDD is a power supply terminal, where a point G is grounded. TEC+/TEC− are respectively connected to the two ends of the semiconductor refrigerator. When a current direction is from TEC+ to TEC−, the refrigerator is cooling; when the current direction is from TEC− to TEC+, the refrigerator is heating. The H-bridge circuit is composed of two groups of MOS tubes, where the MPA (PMOS) and the MNA (NMOS) form one group, and the MPB (PMOS) and the MNB (NMOS) form the other group. For the PMOS tube, when the gate-source voltage difference is less than 0, the PMOS tube is turned on. On the contrary, for the NMOS tube, when the gate-source voltage difference is greater than 0, the NMOS tube is turned on. The examples of two groups of MOS control waveform are shown in FIG. 4. When NDRVA is at high voltage and PDRVA is at low voltage, or the NDRVB is at low voltage and the PDRVB is at high voltage, the MPA and the MNA are turned on; the MPB and the MNB are turned off, so a current forms a direction of A, B, TEC+, TEC−, E, F, G, and the TEC performs cooling. On the contrary, when the MPA and the MNA are turned off, and the MPB and the MNB are turned on, the current forms a direction of D, E, TEC−, TEC+, B, C, G, and the TEC performs heating. The CT is a triangular wave with the reference voltage is a center, and the EAOUT is the error voltage, that is, a difference between the thermistor test voltage and the upper computer setting voltage. In this way, the voltages of the first voltage control terminal (PORVA), the second voltage control terminal (PORVB), the third voltage control terminal (NORVA), and the fourth voltage control terminal (NORVB) are separately controlled, thereby controlling the cooling and heating of the semiconductor refrigerator (TEC).

When the upper computer control module controls the TEC cooling, the upper computer control module sets the voltage value to increase, the EAOUT output is less than the reference voltage, and the width of the triangle wave at the upper part of EAOUT is greater than the width at the lower part of EAOUT, corresponding to the duty cycle of the square wave below a>b, That is, the cooling time is long and the heating time is short, so as to realize the control of temperature drop, and the greater the difference between the upper computer control module voltage setting and the thermistor voltage, the greater the duty cycle difference, and the higher the cooling efficiency. As the ambient temperature decreases, the difference between the thermistor voltage and the set voltage decreases, and the duty ratios of a and b gradually become equal and constant, and a temperature cooling adjustment is completed.

When the upper computer control module controls the cooling of the TEC, the setting voltage value of the upper computer control module increases; the EAOUT output is less than the reference voltage; the width of the triangle wave at the upper part of EAOUT is greater than the width at the lower part of EAOUT, corresponding to the duty cycle of the lower square wave a>b, that is, a cooling time is long and the a heating time is short, thereby controlling the temperature drop. In addition, the greater the difference between the setting voltage of the upper computer control module and the thermistor voltage, the greater the difference in duty cycle and the higher the cooling efficiency. As the environment temperature decreases, the difference between the thermistor voltage and the setting voltage decreases, and the duty ratios of a and b gradually become equal and constant, thereby completing a temperature heating adjustment.

Through the above-mentioned method, the central control device can adjust the control strategy according to the temperature of the working environment of the pump source, and better assist the stable working of the optical comb system.

Embodiment 3

In this embodiment, both the dynamic adjustment control of the pump source working power adopted in Embodiment 1 and the dynamic adjustment control of the temperature of the working environment of the pump source adopted in Embodiment 2 are adopted in the system for controlling the optical frequency comb. Although the dynamic adjustment and control processes of the two adjustment controls operate separately, the two processes provide cooperative and combined assistance for the stable operation of the optical frequency comb.

When the optical frequency comb is activated, the temperature of the pump source is low, and the temperature of the working environment of the pump source may be lower or higher than the temperature in the stable working condition. At this time, the temperature of the working environment of the pump source is dynamically adjusted and controlled to make the environment temperature rapidly reaching the reference environment temperature required for mode-locking, creating a good temperature condition for the optical comb system for the mode-locked state, and the dynamic adjustment and control of the working power of the pump source can achieve fast mode-locking. After a period of working time, the optical comb system enters the stable working condition, the working power of the pump source can be dynamically adjusted and controlled to maintain the working power of the pump source in the stable working condition. The working temperature is controlled, and the temperature of the working environment of the pump source is dynamically adjusted and controlled, thereby adjusting the working temperature of the pump source, and improving the efficiency of stable control, which is beneficial for the optical comb system to better maintain the stable working condition.

It can be seen that the method and the system for controlling the optical frequency comb of the present disclosure can effectively realize a fast mode-locking control through dynamic adjustment controls and coordination of the working power of the pump source and the temperature of the working environment of the pump source, thereby controlling the optical frequency comb while better achieving the energy-saving effect of the adjustment and control process. At the same time, the efficiency of the stable operation and control of the optical frequency comb is improved, and the problem of insufficient working stability of the optical frequency comb under different working condition is effectively solved, thereby better guaranteeing the measurement accuracy of the optical comb system.

It should be noted that, the above embodiments are only intended to illustrate the technical solutions of the present disclosure, but not to limit the present disclosure. Although the present disclosure has been described with reference to the preferred embodiments, those of ordinary skill in the art can make various changes in form and details without departing from the spirit and scope of the present disclosure as defined by the appended claims.

What is claimed is:

1. A system for controlling an optical frequency comb, comprising:
   a pump source, arranged in a temperature-controlled environment for generating pump light;
   a voltage-controlled constant current source, for driving the pump source and adjusting and controlling a working power of the pump source;
   a pump source temperature sensing device, for collecting a temperature of the pump source when the pump source is working;
   an environment temperature control device, for adjusting and controlling a temperature of a working environment;
   an environment temperature sensing device, for sensing the temperature of the working environment; and
   a central control device, for collecting parameters comprising the working power of the pump source, the temperature of the pump source and the temperature of the working environment, and controlling the voltage-controlled constant current source or/and the environment temperature control device according to the collected parameters and a preset control parameter, to further dynamically adjust the working power of the pump source or/and the temperature of the working environment of the pump source in an optical frequency comb system, thereby achieving a stable control of the optical frequency comb;
   wherein the central control device comprises a lower computer control module and an upper computer control module;
   the lower computer control module is provided for respectively communicating with the pump source temperature sensing device, the environment temperature sensing device, the voltage-controlled constant current source and the environment temperature control device to receive parameters comprising the working power of the pump source, the temperature of the pump source, and the temperature of the working environment, transmitting the received parameters to the upper computer control module, and respectively sending a control instruction to the voltage-controlled constant current source and the environment temperature control device according to an instruction from the upper computer control module;
   the upper computer control module is provided for instructing the lower computer control module to respectively send the control instruction to the voltage-controlled constant current source and the environment temperature control device according to the received parameters and the preset control parameter, to dynamically adjust the working power of the pump source or/and the temperature of the working environment, so as to achieve the stable control of the optical frequency comb;

the preset control parameter in the upper computer control module comprises a first power-temperature curve of the pump source and information for setting the working power of the pump source under a mode-locked state in a stable working condition; the first power-temperature curve shows a relationship between the temperature of the pump source and the working power of the pump source when the pump source is under a mode-locked state in a starting working condition;

the upper computer control module is configured to dynamically adjust the working power of the pump source by:

upon starting, searching a first value of the working power of the pump source from the first power-temperature curve according to the temperature of the pump source; instructing the lower computer control module to control the voltage-controlled constant current source to adjust the working power of the pump source according to the first value; and beginning to timing; and when a preset duration for stably starting the pump source is reached, instructing the lower computer control module to adjust the working power of the pump source according to the information about setting the working power of the pump source when the pump source is under the mode-locked state in the stable working condition.

2. The system of claim 1, wherein a digital-to-analog (DA) group is provided between the lower computer control module and control signal terminals of the voltage-controlled constant current source, the environment temperature control device, the pump source temperature sensing device, and the environment temperature sensing device for respectively performing a digital-to-analog conversion communication, thereby converting a digital signal to an analog signal to control the voltage-controlled constant current source, the environment temperature control device, the pump source temperature sensing device, and the environment temperature sensing device; an analog-to-digital (AD) group is provided between the lower computer control module and feedback signal terminals of the voltage-controlled constant current source, the pump source temperature sensing device and the environment temperature sensing device for performing an analog-to-digital conversion communication, thereby converting a feedback analog signal to a digital signal; the digital signal is sent to the lower computer control module, and then transmitted to the upper computer control module through a digital signal transmission method.

3. The system of claim 1, wherein the information for setting the working power of the pump source under the mode-locked state in the stable working condition comprises a second power-temperature curve of the pump source under the mode-locked state in the stable working condition, the second power-temperature curve showing a relationship between the temperature of the pump source and the working power of the pump source required for mode-locking in the stable working condition;

the upper computer control module is configured to adjust and set the working power of the pump source by:

searching a second value of the working power of the pump source from the second power-temperature curve in real time according to the temperature of the pump source when the pump source is under the mode-locked state in the stable working condition; and instructing the lower computer control module to control the voltage-controlled constant current source to adjust the working power of the pump source in real time according to the second value.

4. The system of claim 1, wherein the preset control parameter in the upper computer control module comprises a mode-locking reference environment temperature and a reference temperature of the pump source in the stable working condition;

the upper computer control module is configured to dynamically adjust the temperature of the working environment by:

upon starting, instructing the lower computer control module to control the environment temperature control device to adjust the temperature of the working environment according to the mode-locking reference environment temperature;

after the temperature of the working environment reaches the mode-locking reference environment temperature, continuously controlling the temperature of the working environment according to the mode-locking reference environment temperature;

determining in real time whether a difference between a collected temperature of the pump source and the reference temperature of the pump source in the stable working condition exceeds a preset warning range of a self-adjusting temperature of the pump source; and when the difference exceeds the preset warning range, adjusting the temperature of the working environment to restore the difference to the preset warning range.

* * * * *